United States Patent
Sujan et al.

(10) Patent No.: US 9,272,621 B2
(45) Date of Patent: Mar. 1, 2016

(54) SYSTEMS AND METHODS FOR VEHICLE SPEED MANAGEMENT

(71) Applicant: Cummins Inc., Columbus, IN (US)

(72) Inventors: Vivek Anand Sujan, Columbus, IN (US); Phani Vajapeyazula, Columbus, IN (US); Kenneth Follen, Greenwood, IN (US); An Wu, Columbus, IN (US); Howard Robert Forst, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/261,010

(22) Filed: Apr. 24, 2014

(65) Prior Publication Data

US 2015/0306957 A1 Oct. 29, 2015

(51) Int. Cl.
| | |
|---|---|
| *B60T 8/24* | (2006.01) |
| *G05D 1/00* | (2006.01) |
| *G05D 5/00* | (2006.01) |
| *G06F 7/00* | (2006.01) |
| *G06F 17/00* | (2006.01) |
| *B60K 31/00* | (2006.01) |
| *B60W 30/14* | (2006.01) |
| *B60W 40/076* | (2012.01) |

(52) U.S. Cl.
CPC .............. *B60K 31/00* (2013.01); *B60W 30/143* (2013.01); *B60W 40/076* (2013.01); *B60W 2550/142* (2013.01); *B60W 2720/106* (2013.01)

(58) Field of Classification Search
CPC ........ G07C 5/0808; G07C 5/00; G07C 5/008; G07C 5/085; G01C 21/34; G01C 21/36; G01C 21/00; G01C 21/20; G01C 21/26; G01C 23/00; B60K 31/0008; B60K 31/0058; B60K 31/00; B60K 31/0083; B60K 2016/023; B60K 2026/025

USPC ........ 701/1, 410, 117, 36, 3, 118, 16, 96, 93, 701/15, 94, 123, 25, 428, 51, 91, 95; 180/65.275, 65.285, 8.1
See application file for complete search history.

(56) References Cited

U.S. PATENT DOCUMENTS

| | | | | |
|---|---|---|---|---|
| 5,832,400 | A | 11/1998 | Takahashi et al. | |
| 5,839,534 | A * | 11/1998 | Chakraborty | B60K 31/0008 180/169 |
| 5,995,895 | A * | 11/1999 | Watt | A01B 79/005 56/10.2 G |
| 6,044,321 | A * | 3/2000 | Nakamura | B60K 31/0008 180/179 |
| 6,128,570 | A | 10/2000 | Akhteruzzaman | |
| 6,278,928 | B1 * | 8/2001 | Aruga | F16H 59/66 477/97 |
| 6,363,310 | B1 * | 3/2002 | Schuplin | B60K 31/04 123/319 |
| 6,370,470 | B1 * | 4/2002 | Yamamura | B60K 31/0008 180/170 |

(Continued)

FOREIGN PATENT DOCUMENTS

WO 2008094114 A1 8/2008

*Primary Examiner* — Calvin Cheung
*Assistant Examiner* — Luis A Martinez Borrero
(74) *Attorney, Agent, or Firm* — Taft Stettinius & Hollister LLP (57) ABSTRACT

Controlling a speed of a vehicle based on at least a portion of a route grade and a route distance divided into a plurality of route sections, each including at least one of a section grade and section length. Controlling the speed of the vehicle is further based on determining a cruise control speed mode for the vehicle for each of the plurality of route sections and determining a speed reference command of the vehicle based on at least one of the cruise control speed mode, the section length, the section grade, and a current speed.

37 Claims, 6 Drawing Sheets

(56) References Cited

U.S. PATENT DOCUMENTS

| | | | |
|---|---|---|---|
| 6,374,173 B1 | 4/2002 | Ehlbeck | |
| 6,847,887 B1 * | 1/2005 | Casino | G01C 21/32 340/995.18 |
| 6,856,897 B1 * | 2/2005 | Phuyal | G06T 17/05 340/995.24 |
| 6,975,931 B2 * | 12/2005 | Adachi | B60K 31/0008 123/352 |
| 7,054,733 B2 * | 5/2006 | Kubota | B60W 30/16 180/179 |
| 7,072,762 B2 * | 7/2006 | Minami | G01F 9/023 340/439 |
| 7,308,961 B2 * | 12/2007 | Satou | B60K 31/04 180/170 |
| 7,426,432 B2 * | 9/2008 | Kawazoe | B60W 30/143 180/170 |
| 7,440,835 B2 * | 10/2008 | Shima | B60K 31/0008 180/169 |
| 7,680,578 B2 * | 3/2010 | Matsunaga | B60T 8/172 701/65 |
| 7,693,641 B2 * | 4/2010 | Maruki | G01M 17/0072 123/350 |
| 8,036,803 B2 * | 10/2011 | Michi | B60K 31/0008 701/93 |
| 8,370,040 B2 * | 2/2013 | Inoue | B60W 10/06 701/70 |
| 8,498,795 B2 * | 7/2013 | Eriksson | B60W 10/08 123/236 |
| 8,498,809 B2 * | 7/2013 | Bill | G01C 21/3407 340/995.14 |
| 8,843,288 B1 * | 9/2014 | Rogalski | B60W 30/143 701/65 |
| 2002/0138190 A1 * | 9/2002 | Hellmann | B60K 31/0008 701/78 |
| 2003/0109980 A1 * | 6/2003 | Kojima | B60K 31/0058 701/96 |
| 2004/0084237 A1 | 5/2004 | Petrie, Jr. | |
| 2005/0027423 A1 * | 2/2005 | Minami | G01F 9/023 701/51 |
| 2007/0192013 A1 * | 8/2007 | Bando | B60T 7/22 701/93 |
| 2007/0244619 A1 * | 10/2007 | Peterson | F02D 9/02 701/70 |
| 2008/0091327 A1 * | 4/2008 | Tsuchiya | B60K 31/0066 701/93 |
| 2008/0319618 A1 | 12/2008 | Sjogren et al. | |
| 2009/0076701 A1 * | 3/2009 | Inoue | B60W 30/16 701/93 |
| 2009/0164081 A1 | 6/2009 | Meloche et al. | |
| 2009/0259354 A1 | 10/2009 | Krupadanam et al. | |
| 2010/0030458 A1 | 2/2010 | Coughlin | |
| 2010/0049400 A1 | 2/2010 | Duraiswamy et al. | |
| 2011/0106388 A1 | 5/2011 | Boeckenhoff et al. | |
| 2011/0160990 A1 * | 6/2011 | Mineta | G01C 21/3469 701/123 |
| 2011/0166754 A1 | 7/2011 | Kolk et al. | |
| 2011/0276216 A1 * | 11/2011 | Vaughan | B60W 10/06 701/31.4 |
| 2012/0022764 A1 | 1/2012 | Tang et al. | |
| 2012/0197504 A1 * | 8/2012 | Sujan | G01C 21/3469 701/70 |
| 2012/0209505 A1 * | 8/2012 | Breed | G01C 21/3697 701/409 |
| 2013/0030668 A1 * | 1/2013 | Eriksson | B60W 10/06 701/94 |
| 2013/0085651 A1 * | 4/2013 | Johannsson | B60W 30/143 701/93 |
| 2014/0244129 A1 * | 8/2014 | Filev | B60K 31/00 701/93 |
| 2014/0277835 A1 * | 9/2014 | Filev | G01C 21/3469 701/2 |
| 2015/0049913 A1 * | 2/2015 | Zhong | G06T 7/60 382/104 |

\* cited by examiner

SYSTEMS AND METHODS FOR VEHICLE SPEED MANAGEMENT

The present invention was made with the Government assistance from the U.S. Department of Energy (DOE) under contract No. DE-EE0003403. The U.S. Federal Government may have certain rights therein.

BACKGROUND

The present application generally relates to managing the speed of a vehicle, and in particular to managing the speed of a vehicle operating in various modes of operation such as in a cruise control mode. Vehicle speed may be controlled in various ways, which may result in various efficiency and/or optimization issues. Therefore, further technological developments may be developed in this area.

SUMMARY

One embodiment of the present invention is a unique system and method for managing the speed of a vehicle. Other embodiments include apparatuses, systems, devices, hardware, methods, and combinations for managing the speed of a vehicle. Further embodiments, forms, features, aspects, benefits, and advantages of the present application shall become apparent from the description and figures provided herewith.

BRIEF DESCRIPTION OF THE FIGURES

The description herein makes reference to the accompanying figures wherein like reference numerals refer to like parts throughout the several views, and wherein.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
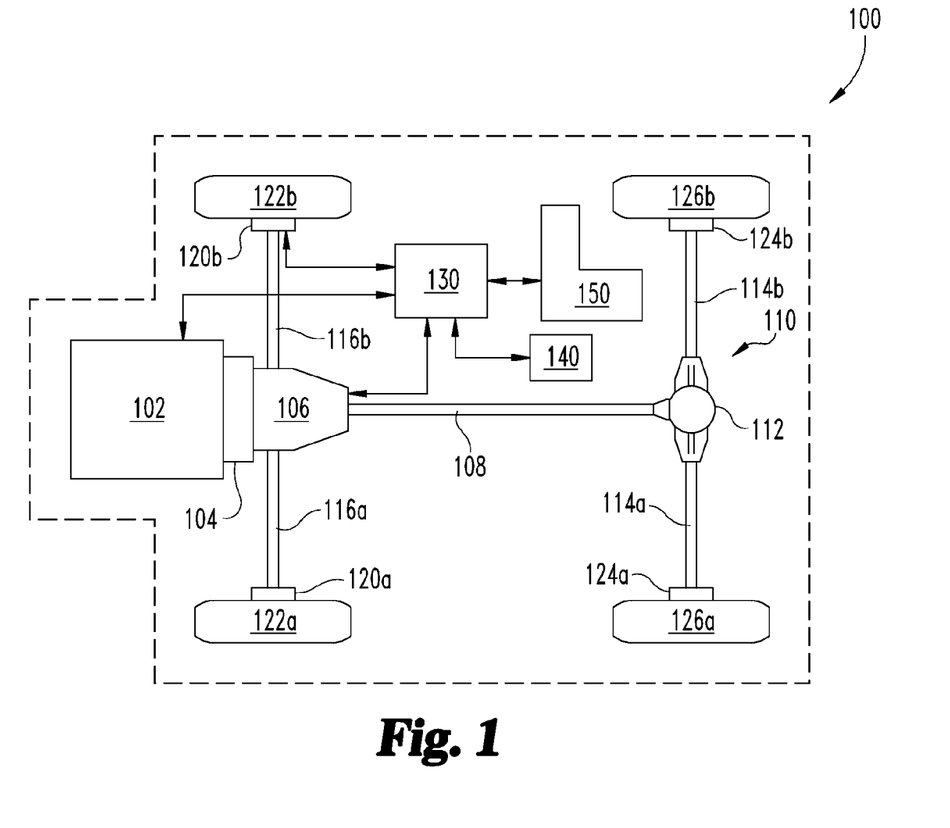
FIG. 1 is a schematic view of an example vehicle system.

With reference to FIG. 1, there is illustrated a schematic view of an example vehicle system 100 including an engine 102, such as an internal combustion engine, structured to generate power for the vehicle system 100. The vehicle system 100 further includes a clutch 104 operably connected to the engine 102 and a transmission 106 for adapting the output torque of the engine 102 via the clutch 104 and transmitting the output torque to a drive shaft 108. Vehicle system 100 illustrates a rear wheel drive configuration including a final drive 110 having a rear differential 112 connecting the drive shaft 108 to rear axles 114a, 114b. It is contemplated that the components of vehicle system 100 may be positioned in different locations throughout the vehicle system 100. In one non-limiting example, in a vehicle having a front wheel drive configuration, the transmission may be a transaxle and the final drive may reside at the front of the vehicle to connect front axles to the engine via the transaxle. It is contemplated that in some embodiments the vehicle may have an all-while drive configuration.

In the illustrated embodiment, vehicle system 100 further includes two front brakes 120a, 120b each positioned between and operably connected to two front wheels 122a, 122b and front axles 116a, 116b, respectively. Vehicle system 100 further includes two rear brakes 124a, 124b each positioned between two rear wheels 126a, 126b and rear axles 114a, 114b, respectively. It is contemplated that vehicle system 100 may have more or fewer tires and/or brakes than illustrated in FIG. 1. In certain embodiments, vehicle system 100 may also include various components not shown, such as a fuel system including a fuel tank, a braking system, an engine intake system, and an engine exhaust system, which may include an exhaust aftertreatment system, to name a few examples.

Vehicle system 100 further includes an electronic or engine control unit (ECU) 130, sometimes referred to as an electronic or engine control module (ECM), or the like, which is directed to regulating and controlling the operation of engine 102. In the illustrated embodiment, the ECU 130 includes a transmission control unit (TCU) directed to the regulation and control of transmission 106 operation. A combined ECU 130 and TCU into a single control module may be referred to as a powertrain control module (PCM) or powertrain control unit (PCU), or the like. ECU 130 is in electrical communication with a plurality of vehicle sensors (not shown) in vehicle system 100 for receiving and transmitting conditions of vehicle system 100, such as temperature and pressure conditions, for example. It is contemplated that in certain embodiments ECU 130 may be integrated within the engine 102 and/or the TCU integrated within the transmission 106. Other various electronic control units for vehicle subsystems are typically present in vehicle system 100, such as a braking system electronic control unit and a cruise control electronic control unit, for example, but such other various electronic control units are not show in vehicle system 100 to preserve clarity.

The ECU 130 in the illustrated embodiment is further connected to a fuel storage tank 150, which is generally one component of a larger fuel delivery system. Other component typically included in a fuel system, including a fuel pump, fuel delivery conduit, and other fuel delivery components are not shown in vehicle system 100 to preserve clarity. ECU 130 is further operatively coupled with and may receive a signal from a fuel storage tank level sensor, not shown, operable to provide a signal indicating the level of fuel in the fuel storage tank 150. The fuel storage tank level sensor need not be in direct communication with fuel storage tank 150, and can be located at any position within vehicle system 100 that provides a suitable indication of applicable fuel level readings in fuel storage tank 150.

In the illustrated embodiment, vehicle system 100 further includes a vehicle speed management (VSM) controller 140 operably connected to the ECU 130 for receiving vehicle system 100 sensor data and conditions. It is contemplated that in certain embodiments the VSM controller 140 may be integrated into the ECU 130. The VSM controller 140 includes stored data values, constants, and functions, as well as operating instructions stored on a computer readable medium. It is further contemplated that in certain embodiments ECU 130 and VSM controller 140 may transmit data communication messages across a controller area network (CAN) bus, not shown.

The CAN bus is a vehicle bus standard message-based protocol designed to allow microcontrollers and devices to communicate with each other within the vehicle without a host computer. The CAN bus was initially designed specifically for automotive applications, though modern applications include aerospace, maritime, industrial automation, and medical equipment. It is contemplated that in certain embodiments an alternative vehicle bus protocol may be used, such as a vehicle area network (VAN) or one of the Society of Automotive Engineers (SAE) vehicle bus protocols, for example.

Any of the operations of example procedures described herein may be performed at least partially by the VSM controller 140. In certain embodiments, the controller includes one or more modules structured to functionally execute the operations of the controller. The description herein including modules emphasizes the structural independence of the aspects of the VSM controller 140, and illustrates one grouping of operations and responsibilities of the VSM controller 140. Other groupings that execute similar overall operations are understood within the scope of the present application. Modules may be implemented in hardware and/or instructions stored on a non-transient computer readable medium, and modules may be distributed across various hardware or instructions stored on a non-transient computer readable medium. More specific descriptions of certain embodiments of controller operations are included in the section referencing FIG. 2. Operations illustrated are understood to be example only, and operations may be combined or divided, and added or removed, as well as re-ordered in whole or part, unless stated explicitly to the contrary herein.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, by receiving a value by which the interpreted parameter can be calculated, and/or by referencing a default value that is interpreted to be the parameter value. Furthermore, it is contemplated that the term sensor as used herein may include a virtual sensor, which may determine a condition directly and/or based on other data.

Figure 2:
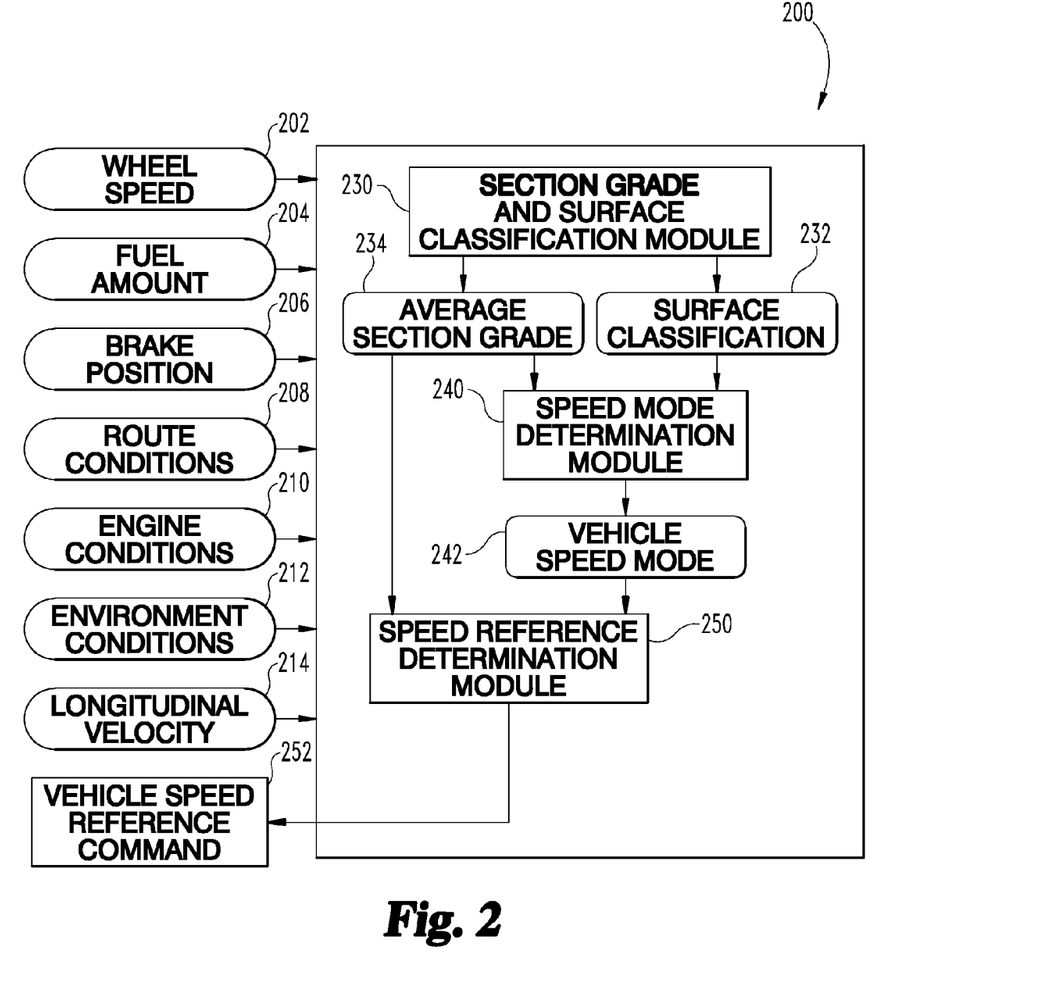
FIG. 2 is a schematic block diagram illustrating an example controller for determining a vehicle speed reference.

One example embodiment 200 of the VSM controller 140 is shown in FIG. 2. In certain embodiments, the VSM controller 140 includes a wheel speed input 202 determined from a wheel speed sensor, a fuel amount input 204 determined from the fuel storage tank level sensor, and a brake position input 206 from a brake sensor operable to provide a signal indicating the brake position of any and/or all brakes 120a, 120b, 124a, and 124b in vehicle system 100. VSM controller 140 may further include a route conditions input 208, an engine conditions input 210, an environmental conditions input 212, and a vehicle longitudinal velocity input 214 which may be calculated and/or estimated using one or more vehicle sensors.

The route conditions input 208 may include at least one of a route grade (e.g., elevation changes of the route), an elevation, a speed limit minimum, a speed limit maximum, a route trip time, a traffic condition, and maximum number of deviations from a cruise set point. In certain embodiments, one or more of the route condition inputs 208 may be determined from a navigation and positioning device, such as a global position system (GPS) device, and/or route data previously stored in memory. The engine conditions input 210 may include an ambient air pressure input, an ambient air temperature input, an engine throttle position input, and an engine torque input determined from one or more engine 102 and/or engine intake system sensors. The environmental conditions input may include a wind input, a precipitation condition, an altitude input, and/or a relative humidity input, each of which may be determined using the one or more vehicle sensors in vehicle system 100.

The VSM controller 140 illustrated in FIG. 2 includes a section grade and surface classification module 230, a speed mode determination module 240, and a speed reference determination module 250. Other VSM controller 140 arrangements that functionally execute the operations of the VSM controller 140 are contemplated in the present application.

The section grade and surface classification module 230 receives and interprets the route grade and divides the route grade into one or more sections based on a predetermined section length. The section grade and surface classification module 230 further determines an average grade 234 over at least a portion of the one or more sections and a surface classification 232 for each of the one or more sections. An example section grade and surface classification module 230 determines the surface classification 232 for each section based on each section's grade over the predetermined section length and a grade percentage threshold for each classification. Each section may be classified as one of an uphill surface when the section grade has a positive grade greater than or equal to an uphill surface percentage threshold, a downhill surface when the section grade has a negative grade greater than or equal to a downhill surface percentage threshold, or a flat surface when the section grade has a positive grade less than uphill surface percentage threshold or a negative grade less than the downhill surface percentage threshold.

The speed mode determination module 240 receives and interprets the surface classification 232 for each section and the average grade 234 to determine a vehicle speed mode 242 (e.g., a speed mode of a vehicle operating with an active cruise control set point). An example speed mode determination module 240 may determine each section as being one of a cruise speed mode (i.e., return to or maintain a cruise speed that may be defined by the operator of the vehicle), a pre-uphill speedup speed mode (i.e., speed up before entering an upcoming uphill surface), an uphill slowdown speed mode (i.e., slow down during a hill surface), a pre-downhill slowdown speed mode (i.e., slow down before entering an upcoming downhill surface), and a downhill speedup speed mode (i.e., speed up during a downhill surface).

The speed reference determination module 250 receives and interprets the surface classification 232 and the average grade 234 to determine a vehicle speed reference command 252. In certain embodiments, the speed reference determination module 250 further determines the vehicle speed reference based on at least one of the wheel speed input 202, the fuel amount input 204, the brake position input 206, the route conditions input 208, the engine conditions input 210, the environment conditions input 212, and the vehicle longitudinal velocity 214. In certain embodiments, the speed reference determination module 250 is configured to provide the vehicle speed reference command 252 to one or more vehicle speed regulators and/or one or more output devices. In certain embodiments, the vehicle speed reference command 252 provided to the one or more vehicle speed regulators may include one or more of a brake actuator position command, a throttle actuator position command, a torque command, a transmission gear ratio command, a fuel injection command, a final drive selection command, a cruise control speed setting command, and/or a requested speed command. In certain embodiments, the one or more output devices configured to receive the vehicle speed reference command 252 may include a dashboard device, a printer, a handheld or mobile device, a public datalink, a device in operative communication with a public datalink, a private datalink, a device in operative communication with a private datalink, a non-transient memory storage location, a non-transient memory buffer accessible to a datalink, a remote network, a device in operative communication with a remote network, and/or a like device capable of displaying an indication of the vehicle speed reference command 252.

A non-limiting example includes the speed reference determination module 250 configured to provide the vehicle speed reference command 252 to an output device which is a non-transient memory storage location. The vehicle speed reference command 252 is read from the non-transient memory storage location and utilized to adjust a speed reference for a vehicle, for example as a cruise control set speed adjustment.

Another non-limiting example includes the speed reference determination module 250 configured to provide the vehicle speed reference command 252 to an output device which is a public datalink, a device in operative communication with a public datalink, a private datalink, a device in operative communication with a private datalink, and/or a non-transient memory buffer accessible to a datalink. The vehicle speed reference command 252 is read from the datalink and/or the datalink buffer and provided to a location visible to a vehicle operator, such as a dashboard display or other visible location.

Yet another non-limiting example includes the speed reference determination module 250 configured to provide the vehicle speed reference command 252 to an output device which is a remote network and/or a device in operative communication with a remote network. The communication to the remote network may pass through intermediate communications, such as through a public or private datalink. The vehicle speed reference command 252 in the example is read from the remote network, and provided to a location visible to one of a vehicle operator and/or a fleet operator. An example includes a smart phone or mobile device providing the vehicle speed reference command 252 to the vehicle operator. Another example includes a remote device, such as a smart phone, laptop, desktop, or mobile device, providing the vehicle speed reference command 252 to the fleet operator. The fleet operator may adjust a vehicle speed reference, either remotely or in a calibration event at a later time—for example for vehicles that will be traveling on the route the current vehicle is traveling on, and/or the fleet operator may utilize the vehicle speed reference command 252 in future fleet planning operations. The described examples are non-limiting, and the inclusion of an example should not be considered to limit potential operations of devices or parameters that are either utilized in the examples or omitted from the examples.

Figure 3:
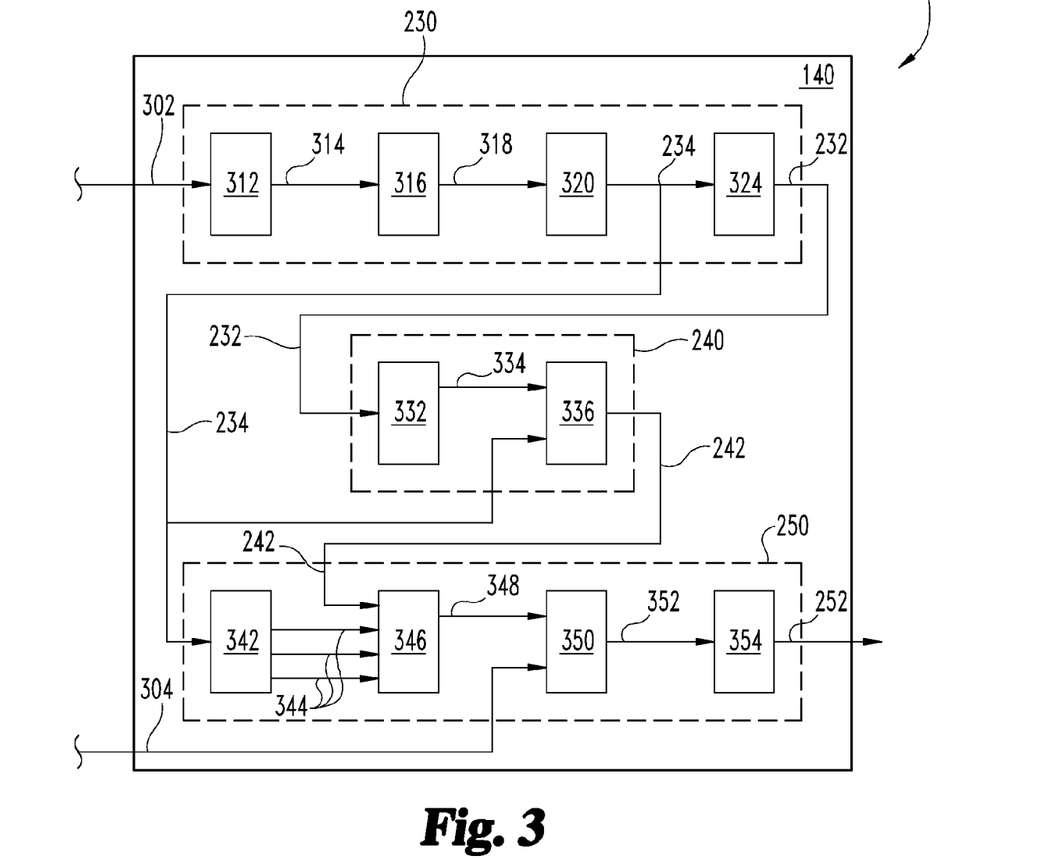
FIG. 3 is a schematic block diagram illustrating an example controller for determining a vehicle speed reference.

FIG. 3 illustrates another example embodiment 300 of the VSM controller 140. FIGS. 4-7 illustrate example embodiments of the input and output signals of the embodiment 300 to and from the VSM controller 140, respectively. With reference to FIG. 3, the VSM controller 140 receives a route grade signal 302 and a current velocity input 304.

Figure 4:
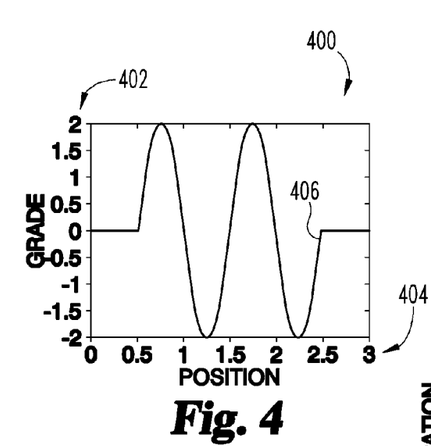
FIG. 4 is a line chart illustrating an example route grade signal input.

The route grade signal 302 is provided to the section grade and surface classification module 230. A non-limiting example of the route grade signal 302 is illustrated in FIG. 4. The route grade signal 302 may contain data for an entire route the vehicle will be travelling during a route trip. It is contemplated that in certain embodiments only a portion of the entire route may be provided to the section grade and surface classification module 230, with a different portion of the entire route being provided at different intervals throughout the route trip. In one non-limiting example, the route grade may be provided in two mile length increments. It is further contemplated that additional inputs may be received and interpreted by the section grade and surface classification module 230 in addition to or as an alternative to the route grade signal 302. Such signals may include an elevation signal, a route position signal, a speed limit signal, a traffic signal, a wind signal, a road condition signal, a precipitation signal, an ambient pressure and/or temperature signal, a throttle position signal, a brake position signal, a fuel amount signal, an air/fuel ratio signal, an engine torque signal, and/or any derivative or second derivative of one of the signals which may be detected or calculated based on one or more sensors positioned throughout vehicle system 100.

In certain embodiments, the section grade and surface classification module 230 includes an elevation filtering module 312, a route grade sectioning module 316, a section grade averaging module 320, and a surface classification module 324. The elevation filtering module 312 outputs a filtered route grade 314 in response to the route grade signal 302 and a route grade filter. The filtered route grade 314 may be filtered by a zero phase shift low pass filter structured to reduce signal noise in the route grade. Different types of filters are contemplated, such as a high pass filter, a band pass filter, and a moving average filter, for example. It is further contemplated that other signals where noise is present in the signal may be filtered.

The route grade sectioning module 316 receives the filtered route grade 314 and sections off the filtered route grade 314 into a route sections output 318 based on the filtered route grade 314 and a section length, or resolution. In one non-limiting example, where the route grade provided is two miles in length and the section length is one-tenth of a mile, the route sections output 318 would be comprised of twenty route sections, each having a section grade and a length of one-tenth of a mile.

The section grade averaging module 320 receives the route sections output 318 and determines the average grade 234 based on each section grade of the route sections output 318 and the total number of route sections included in route sections output 318.

Figure 5:
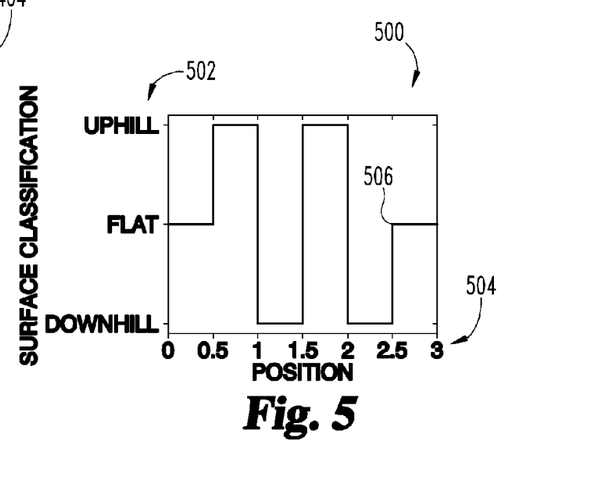
FIG. 5 is a line chart illustrating an example surface classification based on the route grade signal input of FIG. 4.

The surface classification module 324 receives the average grade 234 and determines a surface classification 232 for each route section. One non-limiting example of the surface classification 232 is illustrated in FIG. 5. An example surface classification module 324 determines the surface classification 232 for each route section based on each section grade and a classification threshold for each classification. In certain embodiments, each route section may be classified as one of the following surface classifications: an uphill surface, a downhill surface, and a flat surface. In one example non-limiting embodiment, the classification threshold may be a grade percentage. For example, when the section grade has a positive grade greater than an uphill surface percentage threshold, the route section may be classified as the uphill surface, when the section grade has a negative grade greater than a downhill surface percentage threshold, the route section may be classified as the downhill surface, and when the section grade has a positive grade less than or equal to uphill surface percentage threshold or a negative grade less than or equal to the downhill surface percentage threshold, the route section may be classified as the flat surface. In certain embodiments, it is contemplated that other thresholds may be used in addition to and/or alternatively to the grade percentage classification threshold, such as a hysteresis based threshold defined as a function of the current state, and/or determining a threshold using a search heuristic, such as a genetic algorithm, and/or adaptive control logic.

In certain embodiments, the speed mode determination module 240 includes a mode identification module 332 and a mode identification adjustment module 336. The mode selection system is provided the average grade 234 and the surface classification 232. The mode identification module 332 receives the surface classification 232 and determines a speed mode output 334 for each route section based on the surface classification 232. In certain embodiments, the speed mode output 334 may be based on a lookup table as a function of a current route section and a next route section. In certain embodiments, the current route section may be the route section from the route sections in which the vehicle is currently travelling in and the next route section may be the route section from the route sections in which the vehicle will be travelling in immediately following the current route section. An example mode identification module 332 may identify each route section as being one of a cruise mode (i.e., return to or maintain cruise speed set point), a pre-uphill speedup mode (i.e., speed up before entering the upcoming hill), an uphill slowdown mode (i.e., slow down during the hill), a pre-downhill slowdown mode (i.e., slow down before entering the upcoming downhill), and a downhill speedup mode (i.e., speed up during the downhill). In certain embodiments, it is contemplated that one or more additional modes may be used by the example mode identification module 332 to identify each route section, such as a no speed change mode and/or a coast mode, for example.

The mode identification adjustment module 336 receives the average grade 234 and the speed mode output 334 as inputs to determine and output the vehicle speed mode 242 to allow for a pre-hill adjustment length, which may be applied to each route section. In certain embodiments, the vehicle speed mode 242 may be based on a lookup table as a function of the current route section and the next route section, an example of which is further detailed in FIG. 8.

The current velocity input 304 is provided to the speed reference determination module 250. In the illustrated embodiment, the speed reference determination module 250 includes a speed mode selector module 346, a speed reference determination module 350, and a speed reference determination module 354. The speed reference determination module 250 further includes a piecewise linear parameter module 342 that receives the surface classification 232 for each route section and determines a speed modes output 344 for each route section based on the surface classification 232 for each route section. In certain embodiments, a piecewise linear function of route section distance and route section amplitude may be used to determine the speed mode for each route section. It is contemplated that in certain embodiments a nonlinear function, a polynomial function, an exponential function, a logarithmic function, a trigonometric function, a spline function, a constant function, and/or the like may be used in addition to and/or as an alternative to the piecewise linear function.

The speed mode selector module 346 receives the vehicle speed mode 242 and the speed modes output 344 to determine a current speed mode output 348 for the current route section. The current velocity input 304 and current speed mode output 348 are received by the speed reference determination module 350, which determines a speed reference output 352. In certain embodiments, speed reference output 352 may be determined utilizing the following equation:

$$V(i+1)=V(i)+a*dx \qquad \text{Equation 1}$$

wherein V is the velocity and a is the current speed mode output 348. It is contemplated that the velocity values used in Equation 1 may be measured, calculated, and/or modeled. In certain embodiments, the average grade 234 may be used to further determine speed reference output 352.

The speed reference adjustment module 354 receives the speed reference output 352 and determines the vehicle speed reference command 252. The vehicle speed reference command 252 may include one or more vehicle speed references sent to one or more components of vehicle system 100. In one example, the vehicle speed reference command 252 may be a brake actuator position for a brake actuator in a braking system. Other non-limiting examples include a throttle actuator position, a transmission gear ratio, a final drive selection, a cruise control set point, a fueling command, a torque request, and/or a requested speed. The vehicle speed reference command 252 may be determined using an output limiting threshold, such as a rate limiting threshold and/or saturation threshold, for example.

Figure 6:
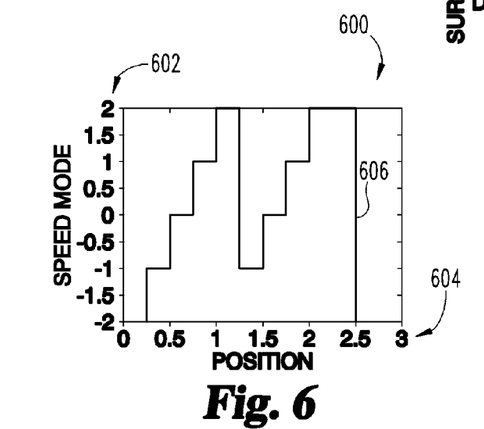
FIG. 6 is a line chart illustrating an example speed mode based on the surface classification of FIG. 5.
Figure 7:
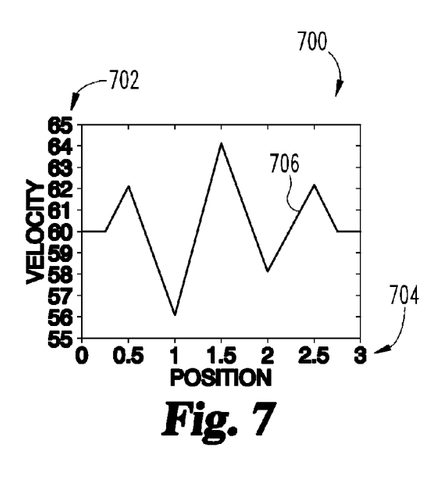
FIG. 7 is a line chart illustrating an example velocity based on the speed mode of FIG. 6.

As noted previous, FIGS. 4-7 illustrate example embodiments of the input and output signals of the embodiment 300 of the VSM controller 140. FIG. 4 illustrates a route grade line chart 400 having a grade variable Y-axis 402, a position variable X-axis 404, and a route grade signal 406. FIG. 5 illustrates a surface classification line chart 500 having a surface classification variable Y-axis 502, a position variable X-axis 504, and a surface classification signal 506. FIG. 6 illustrates a speed mode line chart 600 having a speed mode variable Y-axis 602, a position variable X-axis 604, and a speed mode signal 606. FIG. 7 illustrates a reference velocity line chart 700 having a velocity variable Y-axis 702, a position variable X-axis 704, and a reference velocity signal 706.

Figure 8:
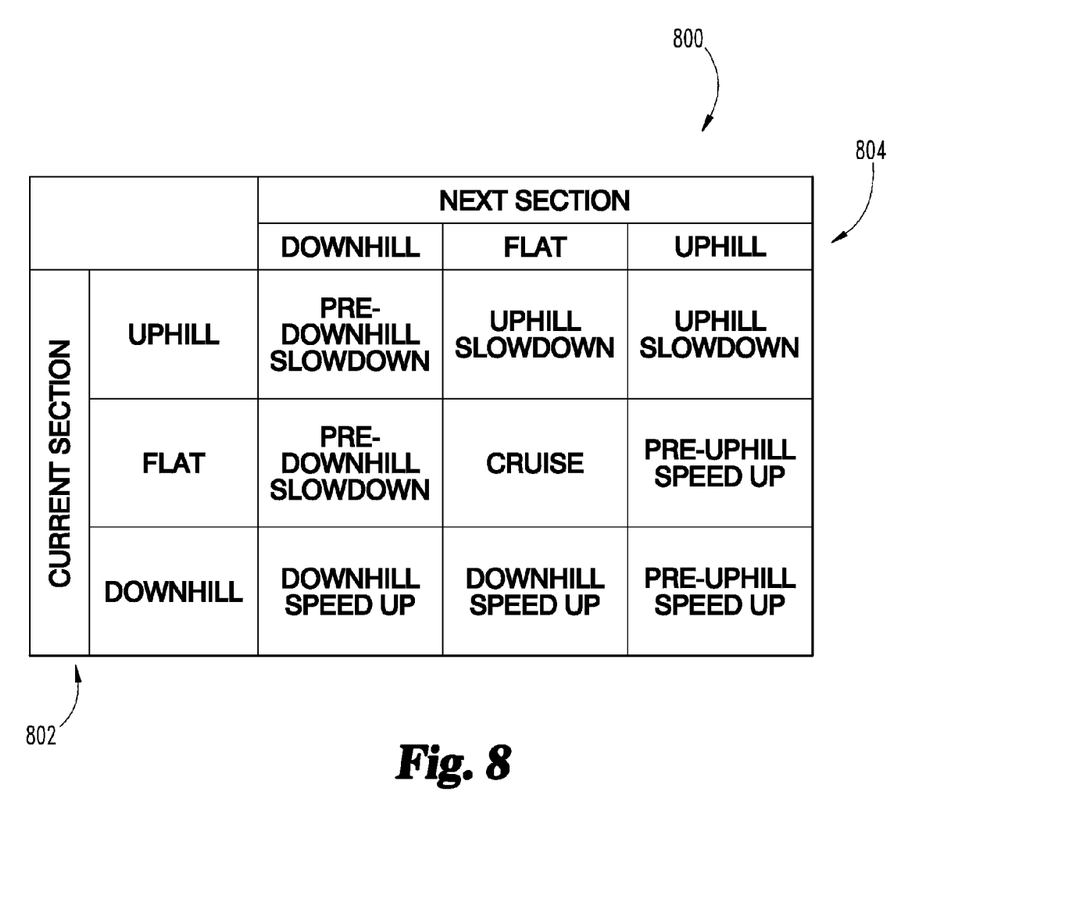
FIG. 8 is an example speed mode lookup table.

FIG. 8 illustrates an example speed mode lookup table 800 as a function of a current route section axis 802 and a next route section axis 804. Each route section axis 802, 804 includes each surface classification for mapping a current speed mode based on the current route section and the next route section. For example, when the current route section is classified as an uphill surface and the next route section is classified as a downhill surface, the current speed mode would be set to the pre-downhill slowdown mode. It is contemplated that different surface classifications and/or speed modes may be used in addition to or as an alternative to the surface classifications and speed modes illustrated in FIG. 8, in which case the speed mode lookup table axes 802, 804 may be modified to reflect the different surface classifications and/or speed modes.

Figure 9:
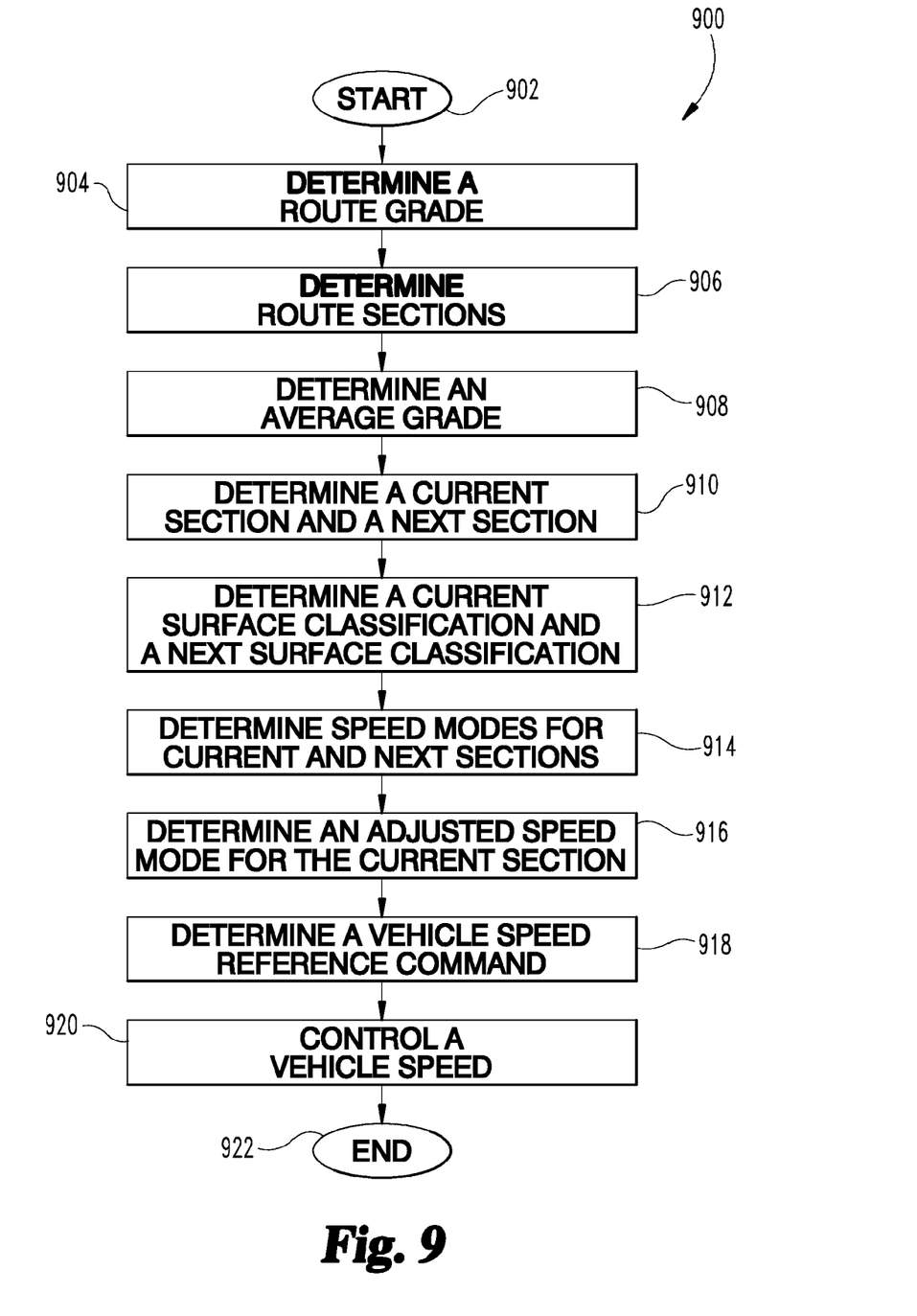
FIG. 9 is a flow diagram illustrating an example procedure for determining a vehicle speed reference.

With reference to FIG. 9, there is illustrated a flow diagram of an example procedure 900 for determining a vehicle speed reference. In certain embodiments the vehicle speed reference may be provided to a vehicle system, such as vehicle system 100, to control a vehicle speed for a vehicle in that is put into operation by programming the VSM controller 140 for use in, for example, vehicle system 100. In certain embodiments, the example procedure 900 may be used to control the vehicle speed of a vehicle operating in an active cruise control mode. In addition to or as an alternative to providing the vehicle speed reference to the vehicle system to control the vehicle speed, it is contemplated that in certain embodiments the vehicle speed reference may be provided to an output device for displaying an indication of the vehicle speed reference. Such output devices may include a dashboard device, a printer, a handheld or mobile device, a public datalink, a device in operative communication with a public datalink, a private datalink, a device in operative communication with a private datalink, a non-transient memory storage location, a non-transient memory buffer accessible to a datalink, a remote network, a device in operative communication with a remote network, and/or a like device capable of displaying an indication of the vehicle speed reference. Procedure 900 begins at operation 902, in which a control routine is started for providing a route grade signal to VSM controller 140 to determine the vehicle speed reference. Operation 902 may begin by interpreting a key-on event, completion of a cycle, restarting procedure 900, or by initiation by the vehicle operator or a technician.

Procedure 900 continues to operation 904, where a route grade is determined based on the route grade signal. It is contemplated that in certain embodiments, the route grade may be for the entire route or a portion of the route. It is further contemplated that the route grade signal may be filtered, such as by a low pass filter, for example. Procedure 900 continues from operation 904 to operation 906, where route sections are determined based on the route grade signal and a route section length. It is contemplated that in certain embodiments the route section length may be a static length defined at the beginning of the route and/or a dynamic length that may be redefined throughout the route. Procedure 900 continues to operation 908, where an average grade is determined based on the route grade and the route section length. In certain embodiments a simple averaging function may be used. It is contemplated that in certain embodiments the average grade function may only use a portion of the route grade.

From operation 908, procedure 900 continues to procedure 910, where a current section and a next section are determined from the route sections determined at operation 906. Procedure 900 continues to operation 912, where each of the current and next sections are classified with a surface classification. It is contemplated that in certain embodiments a threshold may be used to reduce/remove signal chattering, or signal deviations, to determine the surface classification. In certain embodiments, the surface classification may include one of an uphill surface, a downhill surface, and/or a flat surface. Procedure 900 continues from operation 912 to operation 914, where a speed mode is determined for each of the current and next sections based on the surface classification for each section determined in operation 912. The speed mode for each section may be determined using a lookup table as a function of the current section surface classification and the next section surface classification. In certain embodiments the speed mode may include a cruise mode, a pre-uphill speedup mode, an uphill slowdown mode, a pre-downhill slowdown mode, and/or a downhill speedup mode.

From operation 914, procedure 900 continues to operation 916, where an adjusted speed mode for the current section is determined based on the current and next section speed modes determined in operation 914. Procedure 900 then continues to operation 918, where a vehicle speed reference command is determined. In certain embodiment, the vehicle speed reference command may be determined as a function of the current velocity, the average grade, and the current speed mode. Procedure 900 continues from operation 918 to operation 920, where a vehicle speed is controlled based on the vehicle speed reference command determined at operation 918. In certain embodiments, the vehicle speed reference command may include one or more vehicle speed reference commands sent to the ECU 130, another controller, and/or directly to one or more speed control components of vehicle system 100. The speed control components may include a brake actuator, a throttle actuator, a fuel injector, a transmission gear, a final drive, a cruise control system, and/or an engine request directed toward engine torque, for example. Procedure 900 is complete and ends at operation 922, where procedure 900 may be restarted such that the section after the next route section becomes the next route section and the previous next route section becomes the current route section. Procedure 900 may be repeated for the entire route grade signal.

Various aspects of the methods and apparatus are disclosed herein. For example, one aspect involves a method that includes determining a route grade and a route distance, determining at least one of a section grade and a section length for a plurality of route sections of a travel route for a vehicle based on at least a portion of each of the route grade and the route distance, determining a cruise control speed mode for the vehicle for each of the plurality of route sections based on at least one of the section grade and the section length, determining a speed reference command of the vehicle based on at least one of the cruise control speed mode, the section length, the section grade, and a current speed, and controlling, with a controller, a speed of the vehicle based on the speed reference command.

In one embodiment of the method, determining the cruise control speed mode for the vehicle for each of the plurality of route sections is further based on a surface classification of each of the plurality of route sections. In another embodiment, the plurality of route sections comprising a current route section including a current surface classification and a next route section including a next surface classification. Determining the cruise control speed mode is based on at least one of the current surface classification and the next surface classification.

In still another embodiment, determining the speed reference command is further based on at least one of a vehicle condition, an environmental condition, a vehicle route condition, and a fuel amount. In one refinement of the embodiment, the vehicle condition includes at least one of a throttle position, an ambient air pressure, an ambient air temperature, an engine torque, and a brake position. In another refinement of the embodiment, the environmental condition includes at least one of an elevation condition, a wind condition, and a precipitation condition. In still another refinement, the vehicle route condition includes at least one of a maximum speed limit, a minimum speed limit, a maximum route trip time, and a traffic condition.

In yet another embodiment, the method further includes determining an average grade based on at least a portion of the plurality of route sections, determining a surface classification for each of the plurality of route sections based on the section grade, the section length, an average grade, and a surface classification change threshold, and determining an adjusted cruise control speed mode for the vehicle based on the cruise control speed mode for each of the plurality of route sections, the average grade, and a speed adjustment distance threshold. Determining the speed reference command of the vehicle is further based on the adjusted cruise control speed mode.

In one refinement, the surface classification change threshold includes at least one of a grade percentage threshold, a hysteresis threshold, and an adaptive control logic threshold. In a further refinement, the surface classification includes an uphill surface, a downhill surface, and a flat surface. The uphill surface includes the section grade being positive and greater than the grade percentage threshold. The downhill surface includes the section grade being negative and greater than the grade percentage threshold. The flat surface includes the section grade being less than or equal to the grade percentage threshold. In still a further refinement, the method further includes determining a plurality of previous surface classifications for at least a portion of the plurality of route sections. The hysteresis threshold is based on the surface classification and one or more of the plurality of previous surface classifications.

In another refinement, the method further includes determining at least one of a filtered elevation and a filtered grade. Determining each of the filtered elevation and filtered grade includes using at least one of a low pass filter, a high pass filter, a band pass filter, and a moving average filter. Determining the surface classification is further in response to at least one of the filtered elevation and the filtered grade. In yet another refinement, determining the surface classification is further in response the route distance being greater than a distance threshold.

In another embodiment of the method, the cruise control speed mode includes one of a cruise mode, a pre-uphill speedup mode, an uphill slowdown mode, a pre-downhill slowdown mode, and a downhill speedup mode. In still another embodiment, determining the route grade and the route distance is based on at least one of a previously mapped route, a road grade sensor, a global positioning system, and a road grade device operable to provide road grade information. In yet another embodiment, controlling the speed of the vehicle includes controlling at least one of a brake actuator position, a throttle actuator position, a fuel injector, an engine torque, a transmission gear ratio, a final drive selection, and a cruise control set point. In still yet another embodiment, determining the speed reference command includes using at least one function from the group consisting of a piecewise linear function, a nonlinear function, a polynomial function, an exponential function, a logarithmic function, a trigonometric function, a spline function, and a constant function. In yet still another embodiment, the method further includes providing the vehicle speed reference to a an output device. The output device is structured to display an indication of the vehicle speed reference command.

Another aspect involves a method including determining, with a controller, a plurality of route sections along a travel route for a vehicle in active cruise control mode, the plurality of route sections comprising a first route section and a second route section, each of the first route section and the second route section including at least one of a section grade and a section length, determining a vehicle speed mode identification based on at least one of the first route section and the second route section, determining a vehicle speed reference based on at least one of the vehicle speed mode identification, the section length, the section grade, and a current speed, and providing the vehicle speed reference to an output device from the controller.

In one embodiment, the method further included providing, from the controller, the vehicle speed reference to the one or more vehicle speed regulators for controlling a speed of the vehicle based on the vehicle speed reference. In a refinement of the embodiment, the embodiment further includes calculating an average section grade based on the section grade of at least a portion of the plurality of route sections, determining a first route section surface classification in response to the first route section and a surface classification change threshold; and determining a second route section surface classification in response to the second route section and the surface classification change threshold. Determining the vehicle speed reference is further based on at least one of the first and second route section surface classifications.

In a further refinement, the embodiment further includes determining a previous route section comprising one or more of the plurality of route sections previous to the first route section and determining a third route section surface classification in response to the previous route section and the surface classification change threshold. Determining the vehicle speed mode identification is further based on the third route section surface classification.

In another further refinement, the embodiment further includes determining an adjusted vehicle speed mode identification based on the first route section surface classification, the second route section surface classification, the average section grade, a threshold length and the vehicle speed mode identification. Determining the vehicle speed reference is further in response to the adjusted vehicle speed mode identification. In yet a further refinement, the embodiment further includes determining a previous route section comprising one or more of the plurality of route sections previous to the first route section and determining a third route section surface classification in response to the previous route section and the surface classification change threshold. Determining the adjusted vehicle speed mode identification is further based on the third route section surface classification.

In another refinement, each of the first and second route section surface classifications are selected from a surface classification list that includes an uphill surface classification, a downhill surface classification, and a flat surface classification. In yet another refinement, the surface classification change threshold includes at least one of a road grade percentage threshold, a hysteresis threshold, and an adaptive control logic threshold.

In another embodiment, the plurality of route sections comprises at least a current route section including a current surface classification and a next route section including a next surface classification. Determining the vehicle speed mode is further based on at least one of the current surface classification and the next surface classification. In yet another embodiment, the first route section is a current route section that the vehicle is currently on and the second route section is a next route section which the vehicle will be on after the vehicle travels across the section length of the current route section. In still yet another embodiment, determining the vehicle speed reference is further in response to at least one of a saturation threshold and a rate limiter. In yet still another embodiment, the vehicle speed mode identification includes one of a cruise speed mode to return to or maintain a cruise speed, a pre-uphill speedup speed mode to increase the current speed before entering an uphill, an uphill slowdown speed mode to decrease the current speed during the uphill, a pre-downhill slowdown speed mode to decrease the current speed before entering a downhill, and a downhill speedup speed mode to increase the current speed during a downhill.

Still another aspect involves an apparatus that includes an electronic controller in operative communication with a vehicle system in active cruise control mode. The vehicle system includes an engine and a plurality of inputs operable to provide signals indicating conditions of at least one of a route, an environment, and the engine. The electronic controller includes a section grade and surface classification module structured to divide a route grade into one or more sections based on a section length. The one or more sections comprises a current section and a next section, a speed mode determination module structured to determine a vehicle speed mode for each of the one or more sections based on at least one of the current section and the next section and a speed reference determination module structured to output to a display an indication of a vehicle speed reference command based on at least one of a current speed, the vehicle speed mode, a first length of the current section, a first grade of the current section, a second length of the next section, and a second grade of the next section.

In one embodiment, the section grade and surface classification module is further structured to determine an average grade over at least a portion of the one or more sections and a surface classification for each of the one or more sections. The speed mode determination module is further structured to determine the vehicle speed mode for each of the one or more sections based on the surface classification for each of the one or more sections. In another embodiment, the vehicle speed reference command comprises at least one command selected from the group consisting of a brake actuator position command, a throttle actuator position command, a fuel injection command, a torque command, a transmission gear ratio command, a fuel injection command, a final drive selection command, a cruise control speed setting command, and a requested speed command.

In yet another embodiment, the vehicle speed mode includes one of a cruise speed mode, a pre-uphill speedup speed mode, an uphill slowdown speed mode, a pre-downhill slowdown speed mode, and a downhill speedup speed mode. In still another embodiment, the route condition includes at least one of a maximum speed limit, a minimum speed limit, a maximum route trip time, a traffic condition, and a maximum number of deviations from a cruise set point. In yet still another embodiment, the engine condition includes at least one of an ambient air pressure input, an ambient air temperature input, an engine throttle position input, and an engine torque. In still yet another embodiment, the environment condition includes at least one of include a wind amount, a precipitation condition, an altitude, and a relative humidity.

In another embodiment, the surface classification includes at least one of an uphill surface classification, a downhill surface classification, and a flat surface classification. In still another embodiment, the speed reference determination module is further structured to provide the vehicle speed reference command to the vehicle system for controlling one or more vehicle speed regulators.

While the invention has been illustrated and described in detail in the drawings and foregoing description, the same is to be considered as illustrative and not restrictive in character, it being understood that only certain example embodiments have been shown and described and that all changes and modifications that come within the spirit of the inventions are desired to be protected.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus for managing vehicle speed comprising a computer processor, and a computer memory operatively coupled to the computer processor, the computer memory having disposed within it computer program instructions that, when executed by the computer processor, causes the apparatus to:
   determine a route grade and a route distance associated with a travel route of a vehicle;
   determine at least one of a section grade and a section length for a plurality of route sections of a travel route for the vehicle based on at least a portion of each of the route grade and the route distance;
   determine a cruise control speed mode for the vehicle for each of the plurality of route sections based on at least one of the section grade and the section length;
   determine a speed reference command of the vehicle based on at least one of the cruise control speed mode, the section length, the section grade, a current speed and at least one of a sensed fuel level, a sensed engine condition, and a sensed environmental condition; and
   issue a speed reference command to control a speed of the vehicle.

2. The apparatus of claim 1, wherein determining the cruise control speed mode for the vehicle for each of the plurality of route sections is further based on a surface classification of each of the plurality of route sections.

3. The apparatus of claim 1, the plurality of route sections comprising a current route section including a current surface classification and a next route section including a next surface classification, wherein determining the cruise control speed mode is based on at least one of the current surface classification and the next surface classification.

4. The apparatus of claim 1, wherein the sensed engine condition includes at least one of a throttle position, an ambient air pressure, an ambient air temperature, an engine torque, and a brake position.

5. The apparatus of claim 1, wherein the sensed environmental condition includes at least one of an elevation condition, a wind condition, and a precipitation condition.

6. The apparatus of claim 1, further comprising determining a speed reference command based on at least one of a maximum speed limit, a minimum speed limit, a maximum route trip time, and a traffic condition.

7. The apparatus of claim 1, further comprising:
   determining an average grade based on at least a portion of the plurality of route sections;
   determining a surface classification for each of the plurality of route sections based on the section grade, the section length, an average grade, and a surface classification change threshold; and
   determining an adjusted cruise control speed mode for the vehicle based on the cruise control speed mode for each of the plurality of route sections, the average grade, and a speed adjustment distance threshold,
   wherein determining the speed reference command of the vehicle is further based on the adjusted cruise control speed mode.

8. The apparatus of claim 7, wherein the surface classification change threshold includes at least one of a grade percentage threshold, a hysteresis threshold, and an adaptive control logic threshold.

9. The apparatus of claim 8, wherein the surface classification includes an uphill surface, a downhill surface, and a flat surface, wherein the uphill surface includes the section grade being positive and greater than the grade percentage threshold, wherein the downhill surface includes the section grade being negative and greater than the grade percentage threshold, and wherein the flat surface includes the section grade being less than or equal to the grade percentage threshold.

10. The apparatus of claim 9, further comprising:
determining a plurality of previous surface classifications for at least a portion of the plurality of route sections,
wherein the hysteresis threshold is based on the surface classification and one or more of the plurality of previous surface classifications.

11. The apparatus of claim 7, further comprising determining at least one of a filtered elevation and a filtered grade, wherein determining each of the filtered elevation and filtered grade includes using at least one of a low pass filter, a high pass filter, a band pass filter, and a moving average filter, and wherein determining the surface classification is further in response to at least one of the filtered elevation and the filtered grade.

12. The apparatus of claim 7, wherein determining the surface classification is further in response the route distance being greater than a distance threshold.

13. The apparatus of claim 1, wherein the cruise control speed mode includes one of a cruise mode, a pre-uphill speedup mode, an uphill slowdown mode, a pre-downhill slowdown mode, and a downhill speedup mode.

14. The apparatus of claim 1, wherein determining the route grade and the route distance is based on at least one of a previously mapped route, a road grade sensor, a global positioning system, and a road grade device operable to provide road grade information.

15. The apparatus of claim 1, wherein controlling the speed of the vehicle includes controlling at least one of a brake actuator position, a throttle actuator position, a fuel injector, an engine torque, a transmission gear ratio, a final drive selection, and a cruise control set point.

16. The apparatus of claim 1, wherein determining the speed reference command includes using at least one function from the group consisting of a piecewise linear function, a nonlinear function, a polynomial function, an exponential function, a logarithmic function, a trigonometric function, a spline function, and a constant function.

17. The apparatus of claim 1, further comprising:
providing the vehicle speed reference to an output device, wherein the output device is structured to display an indication of the vehicle speed reference command.

18. A non-transitory computer medium with computer executable instructions stored thereon executed by a processor of a computing device to perform a method of managing vehicle speed, the method, comprising:
determining a plurality of route sections along a travel route for a vehicle in active cruise control mode, the plurality of route sections comprising a first route section and a second route section, each of the first route section and the second route section including at least one of a section grade and a section length at the computing device;
determining a vehicle speed mode identification based on at least one of the first route section and the second route section at the computing device;
determining a vehicle speed reference based on at least one of the vehicle speed mode identification, the section length, the section grade, a current speed and at least one of a sensed fuel level, a sensed engine condition, a sensed environmental condition, a maximum speed limit, a minimum speed limit, a maximum route trip time, and a traffic condition at the computing device; and
providing, from the computing device, the vehicle speed reference to one or more vehicle speed regulators for controlling a speed of the vehicle based on the vehicle speed reference.

19. The method of claim 18, further comprising:
calculating an average section grade based on the section grade of at least a portion of the plurality of route sections;
determining a first route section surface classification in response to the first route section and a surface classification change threshold; and
determining a second route section surface classification in response to the second route section and the surface classification change threshold,
wherein determining the vehicle speed reference is further based on at least one of the first and second route section surface classifications.

20. The method of claim 19, further comprising:
determining a previous route section comprising one or more of the plurality of route sections previous to the first route section; and
determining a third route section surface classification in response to the previous route section and the surface classification change threshold,
wherein determining the vehicle speed mode identification is further based on the third route section surface classification.

21. The method of claim 19, further comprising:
determining an adjusted vehicle speed mode identification based on the first route section surface classification, the second route section surface classification, the average section grade, a threshold length and the vehicle speed mode identification, and
wherein determining the vehicle speed reference is further in response to the adjusted vehicle speed mode identification.

22. The method of claim 21, further comprising:
determining a previous route section comprising one or more of the plurality of route sections previous to the first route section; and
determining a third route section surface classification in response to the previous route section and the surface classification change threshold,
wherein determining the adjusted vehicle speed mode identification is further based on the third route section surface classification.

23. The method of claim 19, wherein each of the first and second route section surface classifications are selected from a surface classification list that includes an uphill surface classification, a downhill surface classification, and a flat surface classification.

24. The method of claim 19, wherein the surface classification change threshold includes at least one of a road grade percentage threshold, a hysteresis threshold, and an adaptive control logic threshold.

25. The method of claim 18, wherein the plurality of route sections comprises at least a current route section including a current surface classification and a next route section including a next surface classification, and wherein determining the vehicle speed mode identification is further based on at least one of the current surface classification and the next surface classification.

26. The method of claim 18, wherein the first route section is a current route section that the vehicle is currently on and the second route section is a next route section which the vehicle will be on after the vehicle travels across the section length of the current route section.

27. The method of claim 18, wherein determining the vehicle speed reference is further in response to at least one of a saturation threshold and a rate limiter.

28. The method of claim 18, wherein the vehicle speed mode identification includes one of a cruise speed mode to return to or maintain a cruise speed, a pre-uphill speedup speed mode to increase the current speed before entering an uphill, an uphill slowdown speed mode to decrease the current speed during the uphill, a pre-downhill slowdown speed mode to decrease the current speed before entering a downhill, and a downhill speedup speed mode to increase the current speed during a downhill.

29. An apparatus, comprising:
an electronic controller configured to be in operative communication with a vehicle system in active cruise control mode, wherein the vehicle system includes an engine and wherein the electronic controller comprises:
a section grade and surface classification module configured to receive route grade conditions associated with a route from the vehicle system, to divide the route into one or more sections based on a section length and to define route grade conditions associated with each of the one or more sections of the route;
a speed mode determination module configured to receive the route grade conditions associated with each of the one or more sections of the route from the section grade and surface classification module to determine a vehicle speed mode for each of the one or more sections based on the route grade conditions associated with a current section and a next section; and
a speed reference determination module configured to receive the route grade conditions associated with each of the one or more sections of the route from the section grade and surface classification module, the vehicle speed mode from the speed mode determination module, a current vehicle speed and at least one of a sensed fuel level, a sensed engine condition, and a sensed environmental condition from the vehicle system to generate a vehicle speed reference command.

30. The apparatus of claim 29, wherein the section grade and surface classification module is further configured to determine an average grade over at least a portion of the one or more sections and a surface classification for each of the one or more sections, and wherein the speed mode determination module is further configured to determine the vehicle speed mode for each of the one or more sections based on the surface classification for each of the one or more sections.

31. The apparatus of claim 29, wherein the vehicle speed reference command comprises at least one command selected from the group consisting of a brake actuator position command, a throttle actuator position command, a fuel injection command, a torque command, a transmission gear ratio command, a fuel injection command, a final drive selection command, a cruise control speed setting command, and a requested speed command.

32. The apparatus of claim 29, wherein the vehicle speed mode includes one of a cruise speed mode, a pre-uphill speedup speed mode, an uphill slowdown speed mode, a pre-downhill slowdown speed mode, and a downhill speedup speed mode.

33. The apparatus of claim 29, wherein the speed reference determination module is configured to generated the vehicle speed reference command based on received vehicle route condition including at least one of a maximum speed limit, a minimum speed limit, a maximum route trip time, a traffic condition, and a maximum number of deviations from a cruise set point.

34. The apparatus of claim 29, wherein the sensed engine condition includes at least one of an ambient air pressure input, an ambient air temperature input, an engine throttle position input, and an engine torque.

35. The apparatus of claim 29, wherein the sensed environmental condition includes at least one of include a wind amount, a precipitation condition, an altitude, and a relative humidity.

36. The apparatus of claim 29, wherein the surface classification includes at least one of an uphill surface classification, a downhill surface classification, and a flat surface classification.

37. The apparatus of claim 29, wherein the speed reference determination module is further structured to provide the vehicle speed reference command to the vehicle system for controlling one or more vehicle speed regulators.

* * * * *